US008310995B2

(12) United States Patent
Murai et al.

(10) Patent No.: US 8,310,995 B2
(45) Date of Patent: Nov. 13, 2012

(54) SYSTEMS AND METHODS FOR WIRELESS COMMUNICATION USING SDMA

(75) Inventors: Shinji Murai, Hachioji (JP); Tomoaki Ishifuji, Tokyo (JP); Takashi Yano, Tokorozawa (JP); Masaaki Shida, Hachioji (JP); Shigenori Hayase, Kodaira (JP)

(73) Assignee: Hitachi, Ltd., Tokyo (JP)

( * ) Notice: Subject to any disclaimer, the term of this patent is extended or adjusted under 35 U.S.C. 154(b) by 579 days.

(21) Appl. No.: 11/797,321

(22) Filed: May 2, 2007

(65) Prior Publication Data

US 2007/0274256 A1 Nov. 29, 2007

(30) Foreign Application Priority Data

May 29, 2006 (JP) ................................. 2006-147575

(51) Int. Cl.
*H04W 4/00* (2009.01)

(52) U.S. Cl. ........ 370/329; 370/328; 370/330; 370/334; 370/335; 370/347; 455/450; 455/452.1; 455/452.2

(58) Field of Classification Search .................. 370/328, 370/329
See application file for complete search history.

(56) References Cited

U.S. PATENT DOCUMENTS

| | | | | |
|---|---|---|---|---|
| 5,886,988 | A * | 3/1999 | Yun et al. ........................ | 370/329 |
| 5,926,758 | A * | 7/1999 | Grybos et al. .................. | 455/429 |
| 6,965,774 | B1 * | 11/2005 | Kasapi et al. .................. | 455/450 |
| 7,020,110 | B2 * | 3/2006 | Walton et al. .................. | 370/334 |
| 7,257,088 | B2 * | 8/2007 | Van Erven ...................... | 370/252 |
| 7,620,019 | B1 * | 11/2009 | Smith et al. .................... | 370/334 |
| 2003/0165123 | A1 * | 9/2003 | Saunders et al. ............... | 370/329 |
| 2004/0082364 | A1 * | 4/2004 | Kitazawa et al. .............. | 455/560 |
| 2005/0147023 | A1 * | 7/2005 | Stephens et al. ............... | 370/203 |
| 2005/0277444 | A1 | 12/2005 | Rensburg et al. | |
| 2006/0109814 | A1 * | 5/2006 | Kuzminskiy et al. .......... | 370/329 |
| 2011/0205987 | A1 * | 8/2011 | Teague et al. .................. | 370/329 |

OTHER PUBLICATIONS

Bourdoux, André et al. "Joint TX-RX Optimisation for MIMO-SDMA Based on a Null-space Constraint", IEEE, 2002, pp. 171-174.
Foschini, Gerald J. "Layered Space-Time Architecture for Wireless Communication in a Fading Environment When Using Multi-Element Antennas", Bell Labs Technical Journal, Autumn 1996, Lucent Technologies Inc., pp. 41-59.
Ohgane, Takeo et al., "A Study on a Channel Allocation Scheme with an Adaptive Array in SDMA", IEEE 1997, pp. 725-729.
Extended European Search Report dated Oct. 8, 2007.

* cited by examiner

*Primary Examiner* — Charles Appiah
*Assistant Examiner* — Mazda Sabouri
(74) *Attorney, Agent, or Firm* — Stites & Harbison, PLLC; Juan Carlos A. Marquez, Esq.

(57) ABSTRACT

In a wireless communication system for communicating with a plurality of stations at the same point of time with the same frequency using a Space Division Multiple Access (SDMA), wireless resources are allocated by a first decision unit which evaluates performance of each station obtained when the SDMA is used and which determines periods of time to be allocated to groups of stations formed according to the SDMA technique. Using a first evaluation unit and a second evaluation unit to evaluate performance required by each station and each application, the first decision unit allocates the wireless resources to the stations. It is therefore possible that the wireless resources are efficiently allocated to the stations while preventing an event in which the wireless resources are excessive or insufficient for required quality of service.

16 Claims, 14 Drawing Sheets

FIG. 8

| NUMBER OF SIMULTANEOUS CONNECTION | STA NUMBER | | | | | |
|---|---|---|---|---|---|---|
| | NUMBER OF STREAM (CHANNEL CAPACITY) | | | | | |
| 1 | #1 | | #2 | | #3 | |
| | 2(4) | | 2(4) | | 2(5) | |
| 2 | #1 | #2 | #1 | #3 | #2 | #3 |
| | 2(3) | 2(2) | 2(3) | 2(3) | 2(3) | 2(3) |

FIG. 9

| NUMBER OF SIMULTANEOUS CONNECTION | STA NUMBER | | | | | |
|---|---|---|---|---|---|---|
| | NUMBER OF STREAM (CHANNEL CAPACITY) | | | | | |
| 1 | #1 | | #2 | | #3 | |
| | 2(4) | | 2(4) | | 2(5) | |
| 2 | #1 | #2 | #1 | #3 | #2 | #3 |
| | 2(3) | 2(2) | 2(3) | 2(3) | 2(3) | 2(3) |
| 3 CANDIDATE 1 | #1 | | #2 | | #3 | |
| | 2(3) | | 1(2) | | 1(2) | |
| 3 CANDIDATE 2 | #1 | | #2 | | #3 | |
| | 1(2) | | 2(3) | | 1(1) | |
| 3 CANDIDATE 3 | #1 | | #2 | | #3 | |
| | 1(1) | | 1(2) | | 2(3) | |

FIG. 10

| NUMBER OF SIMULTANEOUS CONNECTION | STA NUMBER ||||||
|---|---|---|---|---|---|---|
| | NUMBER OF STREAM (CHANNEL CAPACITY) / POWER ALLOCATION ||||||
| 1 | #1 || #2 || #3 ||
| | 2(4) || 2(4) || 2(5) ||
| 2 CANDIDATE 1 | #1 | #2 | #1 | #3 | #2 | #3 |
| | 2(3)/5 | 2(2)/5 | 2(3)/5 | 2(3)/5 | 2(3)/5 | 2(3)/5 |
| 2 CANDIDATE 2 | #1 | #2 | #1 | #3 | #2 | #3 |
| | 2(3)/4 | 2(2)/6 | 2(3)/2 | 2(3)/8 | 2(3)/3 | 2(3)/7 |

FIG. 11

| NUMBER OF SIMULTANEOUS CONNECTION | STA NUMBER | | |
|---|---|---|---|
| | CORRELATION VALUE | | |
| 1 | #1 | #2 | #3 |
| | — | — | — |
| 2 | #1,#2 | #1,#3 | #2,#3 |
| | 0.3 | 0.9 | 0.1 |
| 3 | #1,#2,#3 | | |

| STA NUMBER | ANGLE [DEGREE] |
|---|---|
| #1 | 0 |
| #2 | 10 |
| #3 | 180 |
| #4 | 260 |
| #5 | 120 |

SYSTEMS AND METHODS FOR WIRELESS COMMUNICATION USING SDMA

The present application claims priority from Japanese application JP2006-147575 filed on May 29, 2006, the content of which is hereby incorporated by reference into this application.

BACKGROUND OF THE INVENTION

1. Field of the Invention

The present invention relates to systems, methods, and apparatuses for wireless communication to communicate with a plurality of terminals or stations using Space Division Multiple Access (SDMA) with one and the same frequency at one and the same point of time, and in particular, to systems, methods, and apparatuses for wireless communication in which resources of space and time are efficiently allocated in consideration of Quality of Service (QoS).

2. Description of the Related Art

Attention has been drawn to antenna and signal processing techniques capable of tremendously improving the utilization efficiency and the transmission rate of wireless frequencies. One of such techniques is called "Adaptive Array Antenna (AAA)" to adjust, by use of weighting coefficients or weights, amplitude and phases of signals communicated respectively via a plurality of antennas. This improves the signal-to-noise ratio and increases the system communication capacity or channel capacity. There is known a technique "Multiple Input Multiple Output (MIMO)" which increases the data transmission rate using the AAA technique. According to the MIMO system, the channel capacity can be increased by installing, between a transmitter and a receiver, channels the number of which is equal to at most the number of antennas. Additionally, these techniques, when viewed from another perspective, can be categorized into (1) Space Division Multiple Access (SDMA) to transmit signals to two or more stations and (2) Space Division Multiplexing (SDM) to transmit signals to one and the same station. In the SDMA technique, the amplitude and phases of signals communicated respectively via a plurality of antennas are adjusted using weights to transmit mutually different data sequences to a plurality of stations with one and the same frequency at one and the same point of time by use of the spatial orthogonality of the signals on the transmission paths. On the other hand, according to the SDM technique, the amplitude and phases of signals communicated respectively via a plurality of antennas are adjusted using weights to transmit mutually different data sequences to one and the same station with one and the same frequency at one and the same point of time by use of the spatial orthogonality of the signals on the transmission paths. Also, there is known a technique "MIMO-SDMA" implemented as a combination of the SDMA and MIMO techniques. In the MIMO-SDMA technique, the SDMA technique is employed for different terminals and the SDM technique is utilized for the one and the same terminal. The SDMA technique is described, for example, in an article, T. Ohgane, "A Study on a channel allocation scheme with an adaptive array in SDMA" IEEE 47th VTC, Vol. 2, 1997, pp. 725-729. The SDM technique is described, for example, in an article, G. J. Foschini, "Layered space-time architecture for wireless communication in fading environment when using multi-element antennas", Bell Labs Tech. J. Autumn 1996, pp. 41-59. The MIMO-SDMA technique is described, for example, in an article, Andre Bourdoux, Nadia Khaled, "Joint Tx-Rx Optimisation for MIMO-SDMA Based on a Null-space Constraint", IEEE2002. pp. 171-172.

A need exists for a technique which meets the requirement for various application services in addition to the requirement for a higher transmission rate in the wireless communication. These applications have requirements of communication quality such as transmission bands and allowable transmission delay associated with communications thereof. Various schemes have already been discussed to guarantee such requirements for the application services.

SUMMARY OF THE INVENTION

In the wireless communication systems in which neither the Access Point (AP) nor the STAtions (STA) use the SDMA, the communication quality of the station is individually evaluated to secure the required communication quality. In a time-division-based QoS control method of, for example, Enhanced Distributed Channel Access (EDCA) defined by IEEE80211e, time is allocated with a higher priority level to a station requiring high communication quality. On the other hand, when an access point communicates with a plurality of stations with the same frequency at the same point of time using the SDMA, it is known that there exist a plurality of combinations (to be referred to as SDMA groups hereinbelow) of stations and the transmission quality of each station varies depending on the SDMA group associated with the station. Therefore, if each station is individually evaluated to allocate the resource thereto, there possibly occurs, in consideration of the entire SDMA group, a case in which an allocated wireless resource is excessive or insufficient for the required quality of service. Additionally, there exists a method implemented by giving consideration to the difference in the transmission quality between the stations depending on the respective SDMA groups. However, in this method, consideration has been given only to a period of time, which can be accommodated in one time slot when there are used time slots of the same length. Therefore, in consideration of the entire SDMA group, there may occur a case in which an allocated wireless resource is excessive or insufficient for the required quality of service. It is hence difficult to efficiently allocate the wireless resources.

It is therefore an object of the present invention, which has been devised to remove the problems, to efficiently use limited wireless resources in a wireless communication system using the SDMA. Specifically, it is an object of the present invention to provide wireless communication systems and wireless resource control methods in which a plurality of SDMA group candidates are generated and wireless resource allocation is calculated according to the transmission quality of each of the candidates and the communication quality required for each of the candidates to thereby efficiently utilize the wireless resources and to resultantly improve the channel capacity.

To achieve the object according to the present invention, there is provided a wireless communication apparatus including a first evaluation unit which designates particular stations as an SDMA group to evaluate each of the stations of the SDMA group and a first decision unit which determines stations for the SDMA and time allocation for each SDMA group, wherein the first decision unit allocates wireless resources using the first evaluation unit. The apparatus further includes a second evaluation unit to evaluate a performance required by each station and a performance required by each application. The first decision unit allocates wireless resources using the first and second evaluation units.

The first decision unit allocates wireless resources capable of optimization to be carried out by using a calculation method of maximizing the overall channel capacity, a calculation method of equally distributing the channel capacity to the respective stations, a calculation method corresponding to a system including uplink and downlink transmission, a calculation method corresponding to a system implemented in consideration of the quality of service, and a calculation method corresponding to a system including data of absolute guarantee type and data of relative guarantee type.

According to the present invention, there are selected a plurality of SDMA group candidates to be used in a period of time in which the wireless resources are allocated and a period of time is allocated to each of the selected SDMA groups, to thereby improve the wireless resource utilization efficiency and the communication stability. Also, while securing the channel capacity for the stations for the data of absolute guarantee type, the remaining wireless resources can be distributed to the stations for the data of relative guarantee type and hence the channel capacity can be expectedly increased.

Other objects, features and advantages of the invention will become apparent from the following description of the embodiments of the invention taken in conjunction with the accompanying drawings.

BRIEF DESCRIPTION OF THE DRAWINGS

FIG. 8 is a diagram showing an example of a table created in step 302 of FIG. 7 (No. 1).

FIG. 9 is a diagram showing an example of a table created in step 302 of FIG. 7 (No. 2).

FIG. 10 is a diagram showing an example of a table created in step 302 of FIG. 7 (No. 3).

FIG. 11 is a diagram showing an example of a table created in step 303 of FIG. 7 (No. 1).

DESCRIPTION OF THE EMBODIMENTS

Figure 1:
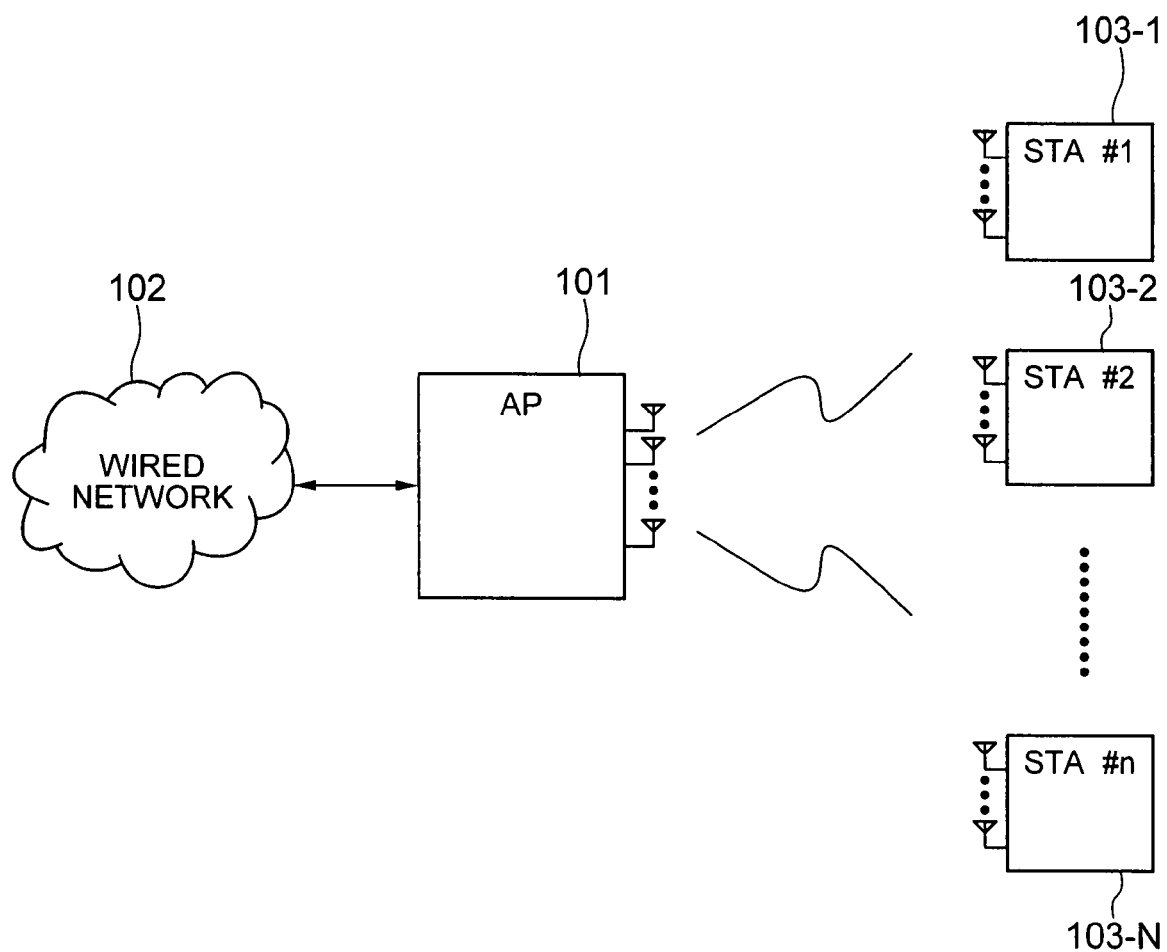
FIG. 1 is a diagram showing an outline of a wireless communication system according to an embodiment of the present invention.

Referring now to the drawings, description will be given of embodiments of the present invention.

FIG. 1 shows an outline of a wireless communication system according to an embodiment of the present invention. In FIG. 1, an access point (AP) 101 indicates a base station which includes a plurality of antennas and which is capable of adaptively changing directivity of the antennas. The access point 101 may be connected to a wired network 102. Each of stations (STAs) 103-1 to 103-N includes at least one antenna. If a plurality of antennas are disposed, the station 103 changes directivity of the antennas. When the access point 101 and the station 103 are in a communicable area in which the access point 101 and the station are able to communicate with each other, data is transmitted from the access point 101 to the other, station 103 (to be referred to as "downlink transmission" hereinbelow) and data is transmitted from the station 103 to the access point 101 (to be referred to as "uplink transmission" hereinbelow). In this regard, the number of the antennas of the access point 101, the number of stations 103, and the number of antennas of each of the stations 103 are not restricted by the embodiment. Next, the configuration of the access point 101 of the present embodiment will be described in detail.

Figure 2:
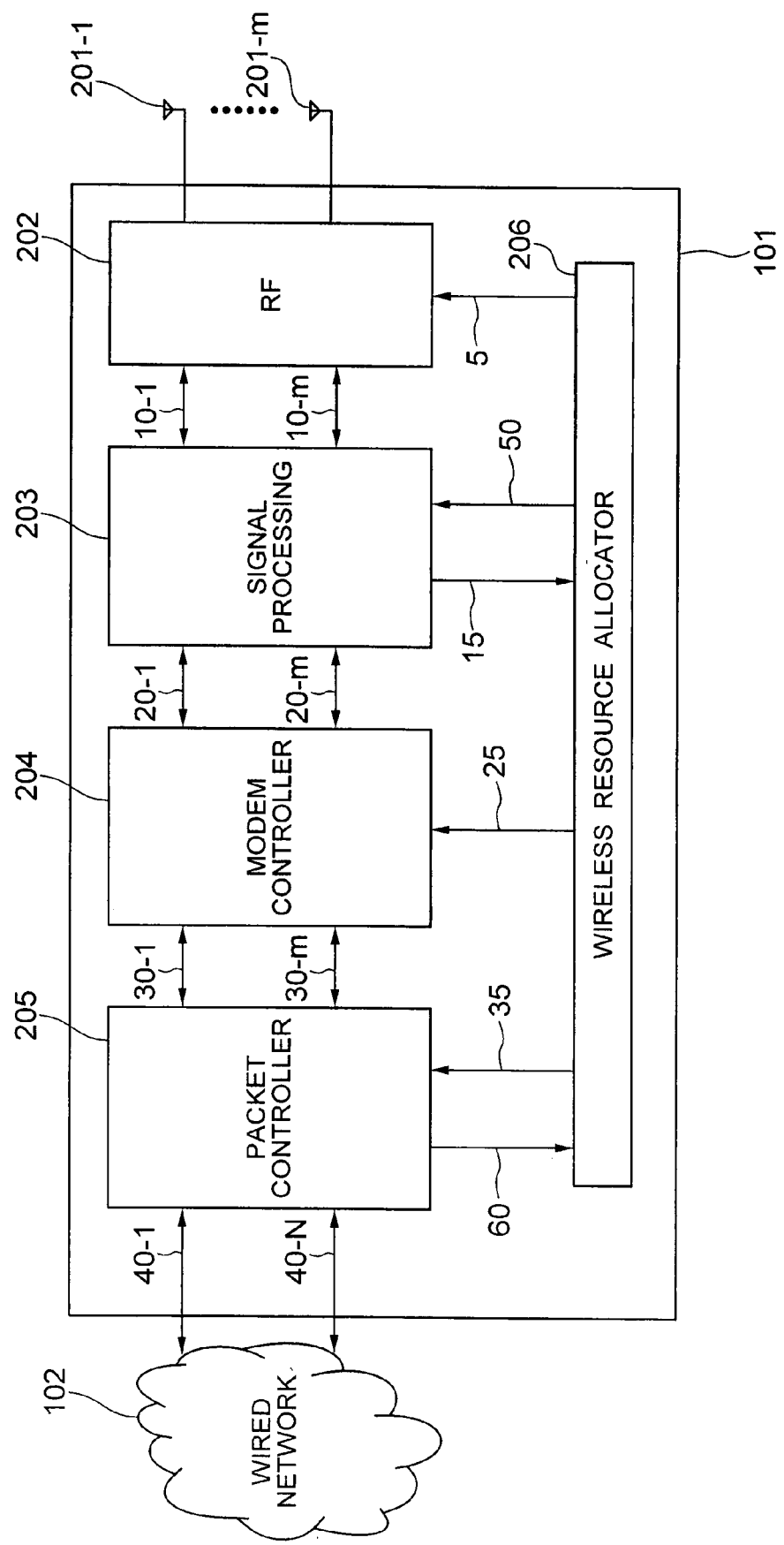
FIG. 2 is a block diagram showing a configuration of an access point (AP) 101.

FIG. 2 shows a configuration of the access point 101 in a block diagram. The access point 101 includes a plurality of antennas 201 to conduct wireless communication with stations, a RF (radio frequency) unit 202, a signal processing unit 203, a modem controller 204, and a packet controller 205 which are connected to each other in this order. The access point 101 further includes, as an aspect of the present invention, a wireless resource allocator 206 to obtain channel state information and require information to conduct allocation of wireless resources.

Figure 3:
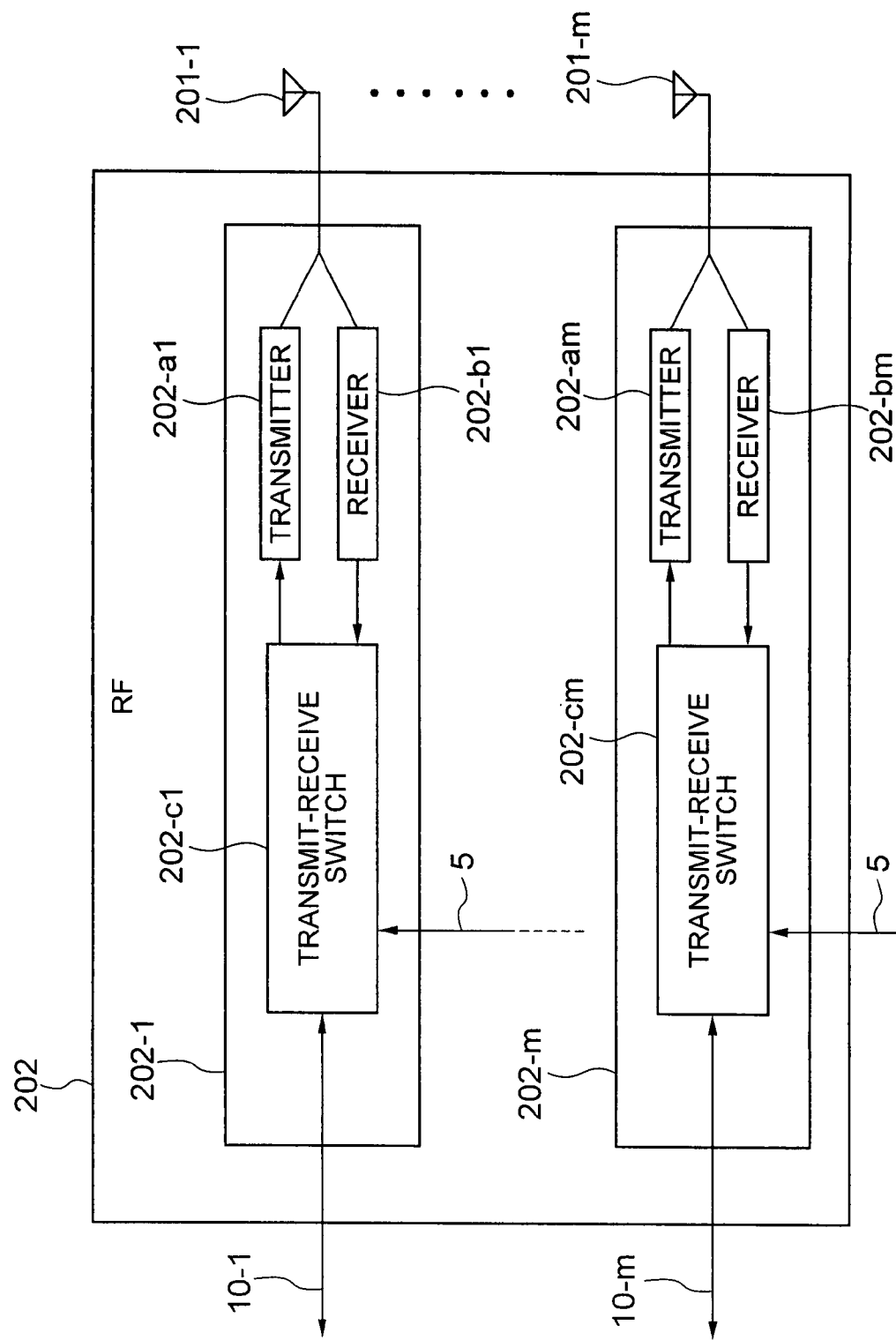
FIG. 3 is a diagram showing a RF unit of FIG. 2.

FIG. 3 shows a configuration of the RF unit 202 in a block diagram. The wireless unit 202 includes first to m-th wireless modules 202-1 to 202-$m$. Each wireless module includes a transmitter 202-$a$, a receiver 202-$b$, and a switch 202-$c$. The switch 202-$c$ conducts a changeover operation between the transmitter 202-$a$ and the receiver 202-$b$ to carry out the uplink transmission and the downlink transmission in a time-division fashion. The transmitter 202-$a$ includes an up-converter and a power amplifier and converts a signal 10-1 to 10-$m$ inputted from the signal processing unit 203 from a low-frequency signal into a high-frequency signal (carrier) and amplifies the high-frequency signal to output the amplified signal to the antenna 201. The receiver 202-$b$ of the RF unit 202 includes a power amplifier and a down-converter and converts a signal received by the antenna 201 from a high-frequency signal into a low-frequency signal and amplifies the low-frequency signal to output the amplified signal 10 to the signal processing unit 203. Description will be given in detail of a signal 5 later together with the wireless resource allocator 206.

Figure 4:
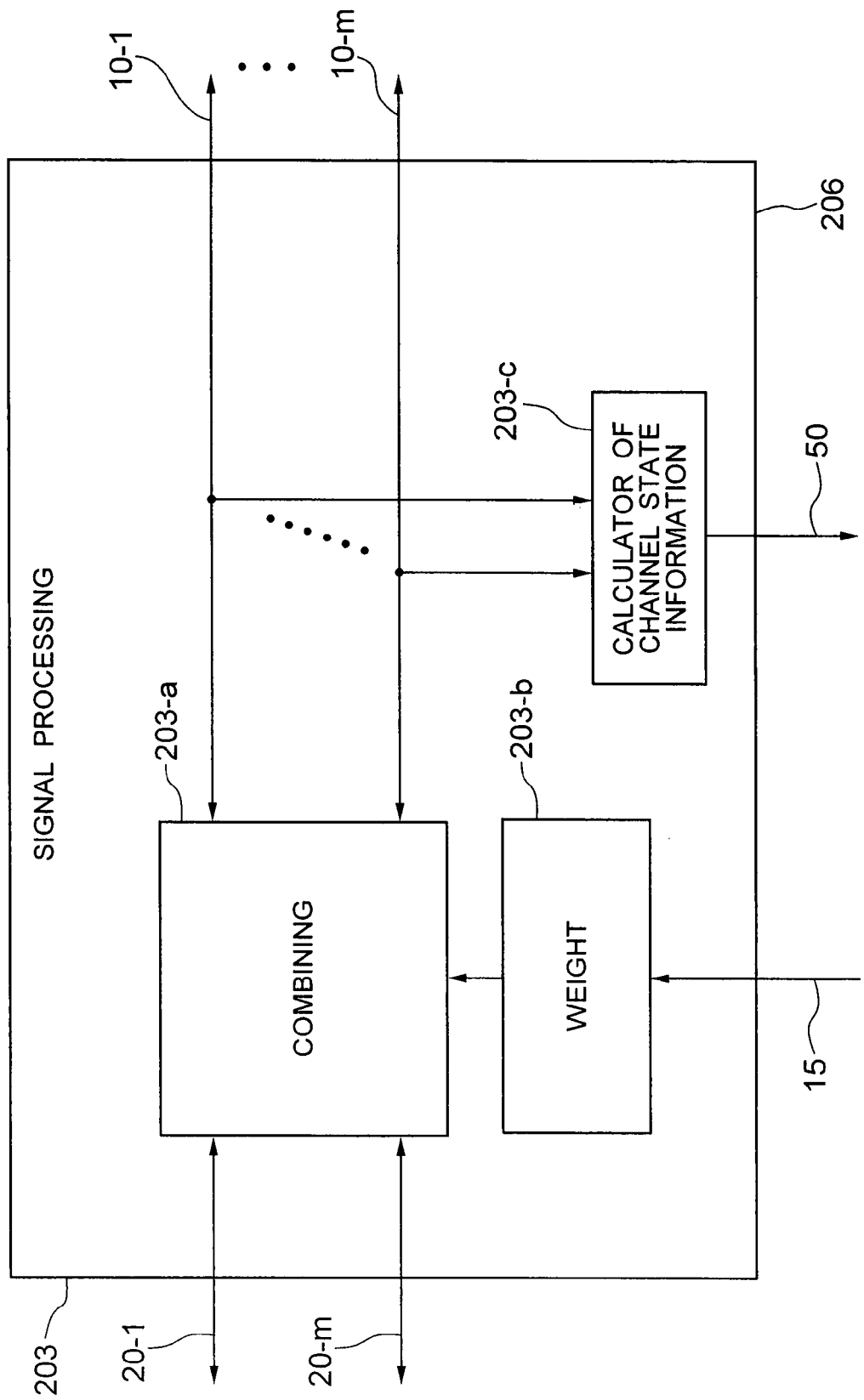
FIG. 4 is a diagram showing a signal processing unit of FIG. 2.

FIG. 4 shows a configuration of the signal processing unit 203 in a block diagram. The signal processing unit 203 includes a combining module 203-$a$, a weight module 203-$b$, and a channel state information calculating module 203-$c$. It is assumed in this situation that the weight module 203-$b$ includes at most m by m weight values. In signal receiving operation, the signal processing unit 203 receives signals 10-1 to 10-$m$ from the RF unit 202 and separates and extracts therefrom signals 20-1 to 20-$m$ to output the signals 20-1 to 20-$m$ to the modem controller 204. Specifically, the combining module 203-$a$ multiplies the input signals 10-1 to 10-$m$ respectively by weights 203-$b$ which are calculated by the wireless resource allocator 206 and which are required for reception signals to obtain signals 20-1 to 20-$m$ and then outputs the signals 20-1 to 20-$m$ to the modem controller 204. In signal transmitting operation, the signal processing unit 203 receives the signals 20-1 to 20-$m$ from the modem controller 204 to conduct combining operation for the signals and outputs the combined signals 10-1 to 10-$m$ to the RF unit 202. Specifically, the combining module 203-$a$ multiplies the input signals 20-1 to 20-$m$ respectively by weights 203-$b$ which are calculated by the wireless resource allocator 206 and which are required for transmission signals to obtain signals 20-1 to 20-*m* and then outputs the signals 20-1 to 20-*m* to the RF unit 202. The channel state information calculating module 203-*c* extracts information of states of channels between the access point and the respective stations. Although the calculating module 203-*c* is arranged in the signal processing unit 203 in the embodiment, the module 203-*c* may also be installed in, for example, the RF unit 202. The signal processing unit 203 may additionally includes signal processing functions, for example, the Fast Fourier Transform (FFT) function and/or the Inverse FFT (IFFT) function necessary for the processing such as Orthogonal Frequency Division Multiplexing (OFDM). Description will be given in detail of a signal 15 later together with the wireless resource allocator 206.

The modem controller 204 executes processing for modulation and demodulation. In modulation processing, the modem controller 204 modulates signals 30-1 to 30-*m* inputted from the packet controller 205 and outputs the resultant signals 20-1 to 20-*m* to the signal processing unit 203. In demodulation processing, the modem controller 204 demodulates signals 20-1 to 20-*m* inputted from signal processing unit 203 and outputs the resultant signals 30-1 to 30-*m* to the packet controller 205. Description will be given in detail of a signal 25 later together with the wireless resource allocator 206.

Figure 5:
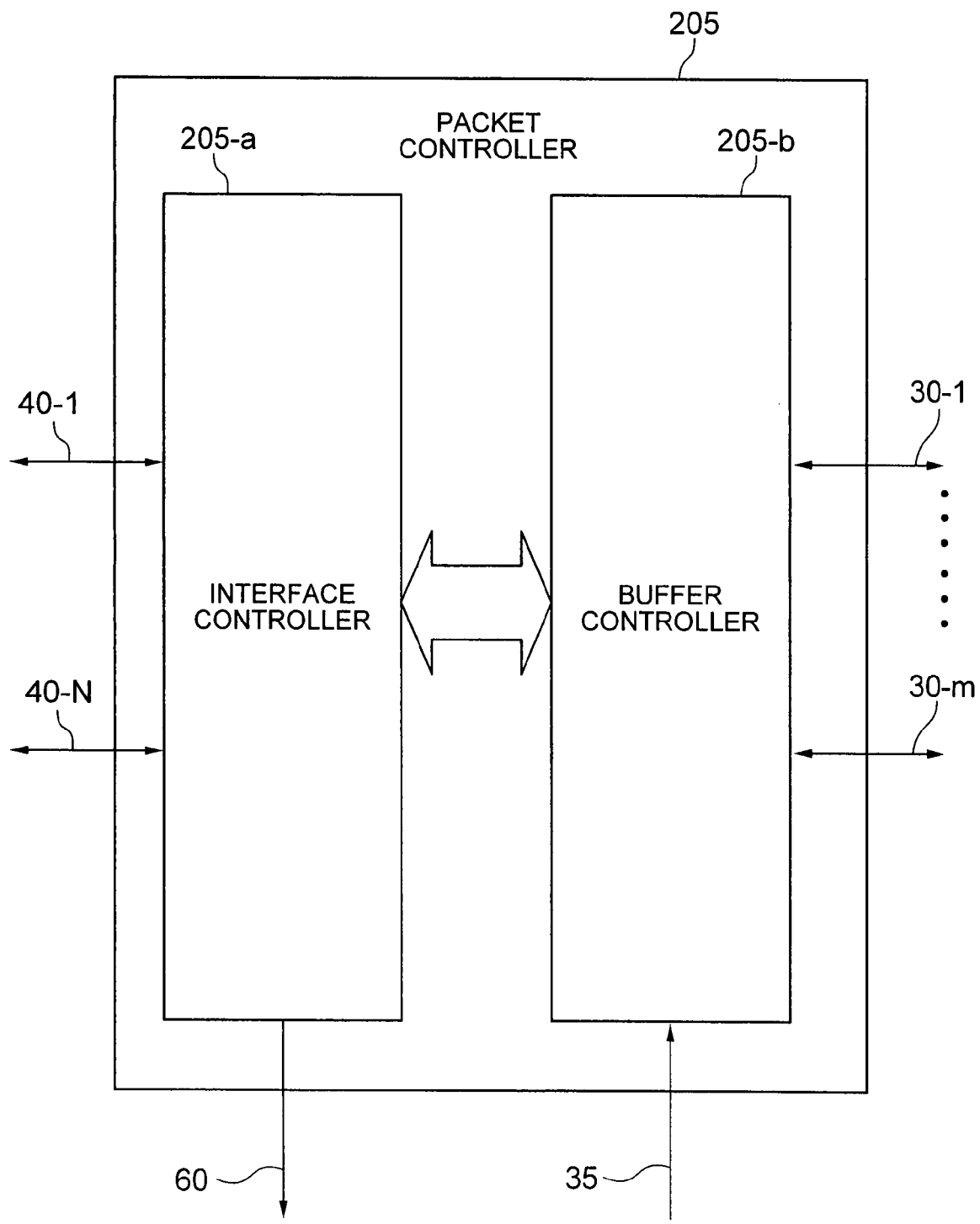
FIG. 5 is a diagram showing a packet controller of FIG. 2.

FIG. 5 shows the configuration of the packet controller 205 in a block diagram. The packet controller 205 includes an interface controller 205-*a* and a buffer controller 205-*b*. The interface controller 205-*a* includes an interface for the wired network 102 and an interface for applications in the access point and executes processing for transmission and reception of information signals and control signals to be handled in the communication system. The interface controller 205 executes, for example, predetermined processing which conforms to IEEE80211 such as processing to convert a PHYsical layer (PHY) frame and a Media Access Control (MAC) frame and processing to extract information signals and control signals from an MAC frame. Information 60 which regards QoS required by a station or an application and which is extracted as above is outputted to the wireless resource allocator 206. The buffer controller 205-*b* conducts a control operation to implement the wireless resource allocation calculated by the wireless resource allocator 206. The buffer controller 205-*b* includes a buffer module to store information therein and a selector to select data of the buffer module. Information necessary for the wireless resource allocation such as capacity of a buffer in the buffer controller 205-*b* may be outputted from the information 60 to the wireless resource allocator 206. Signals 40 to be communicated with the wired network 102 include N signals the number of which is equal to that of the stations. However, the number of signals 40 is not restricted by the configuration of the embodiment. A signal 35 will be described in detail later together with the wireless resource allocator 206.

Figure 6:
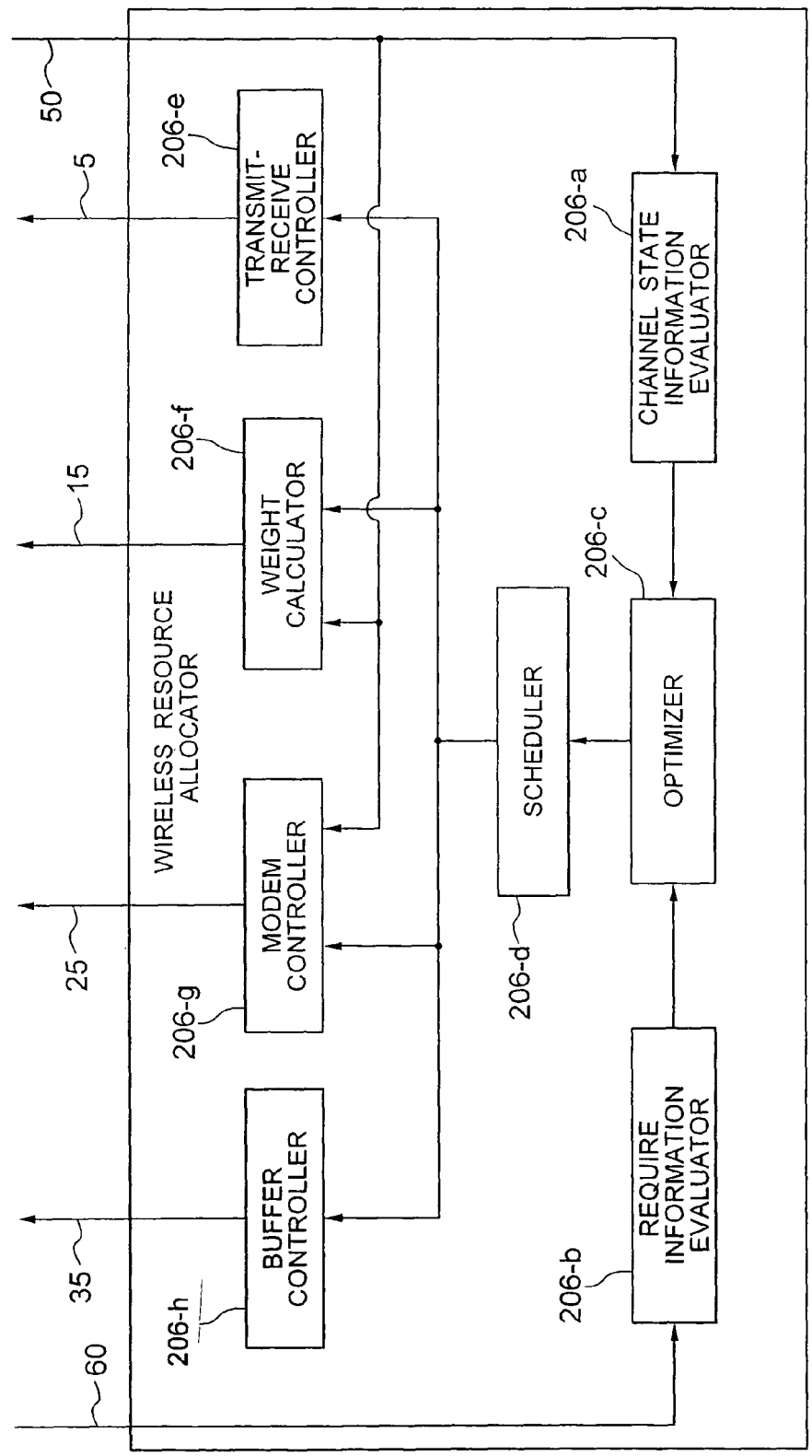
FIG. 6 is a diagram showing a wireless resource allocator of FIG. 2.

FIG. 6 shows a configuration of the wireless resource allocator 206 in a block diagram. The allocator 206 includes a channel state information evaluator 206-*a*, a require information evaluator 206-*b*, an optimizer 206-*c*, a scheduler 206-*d*, a transmit-receive controller 206-*e*, a weight calculator 206-*f*, a modem controller 206-*g*, and a buffer controller 206-*h*. The allocator 206 conducts a control operation for the wireless unit 202, the signal processing unit 203, the modem controller 204, and the packet controller 205 according to a result of wireless resource allocation. The channel state information evaluator 206-*a* receives channel state information 50 extracted by the channel state information calculator 203-*c* for a plurality of stations and accordingly calculates communication performance, for example, the channel capacity for the stations of each SDMA group. The require information evaluator 206-*b* receives require information 60 extracted by the interface controller 205-*a* to calculate communication performance required by each station or application. The optimizer 206-*c* selects, according to signals produced from the evaluators 206-*a* and 206-*b*, candidates of a plurality of SDMA groups to be used within a period of time for the wireless resource allocation and then calculates a ratio of time for each SDMA group thus selected. The optimizer 206-*c* outputs the selected SDMA groups and the ratios of time for the SDMA groups to the scheduler 206-*d*. The scheduler 206-*d* conducts a scheduling operation on the basis of the calculation result from the optimizer 206-*c*. Within the period of time for the wireless resource allocation, the scheduler 206-*d* conducts the scheduling under a condition that the total of the periods of time to be used by the respective SDMA groups corresponds to the ratios of time calculated by the optimizer 206. The transmit-receive controller 206-*e* outputs to the wireless unit 202 signal 5 for a changeover between transmission and reception in an order scheduled by the scheduler 206-*d*. The weight calculator 206-*f* calculates transmission and reception weights for the SDMA by use of the signal 50 from the channel state information calculator 203-*c*. The weight calculator 206-*f* outputs weight signals 15 to the signal processing unit 203 in a sequence scheduled by the scheduler 206-*d*. The modem controller 206-*g* generates a control signal 25 for which the modulation multiple number and the coding ratio are determined by using the signal 50 from the channel state information calculator 203-*c* and outputs the signal 25 to the modem controller 204 in the order scheduled by the scheduler 206-*d*. The buffer controller 206-*h* outputs to the packet controller 205 a control signal 35 to extract a packet scheduled by the scheduler 206-*d*.

In the above description, N indicates the number of stations and m is the number of antennas connected to the access point 101. The RF unit 202, the signal processing unit 203, the modem controller 204, and the packet controller 205 each include constituent components corresponding to the number of antennas (m) and the number of stations (M). However, it is not necessarily required to use all of the constituent components. Although the transmission system and the reception system are commonly configured for the antenna 201, the RF unit 202, the signal processing unit 203, the modem controller 204, and the packet controller 205, the transmission system and the reception system may also be separated from each other.

Figure 7:
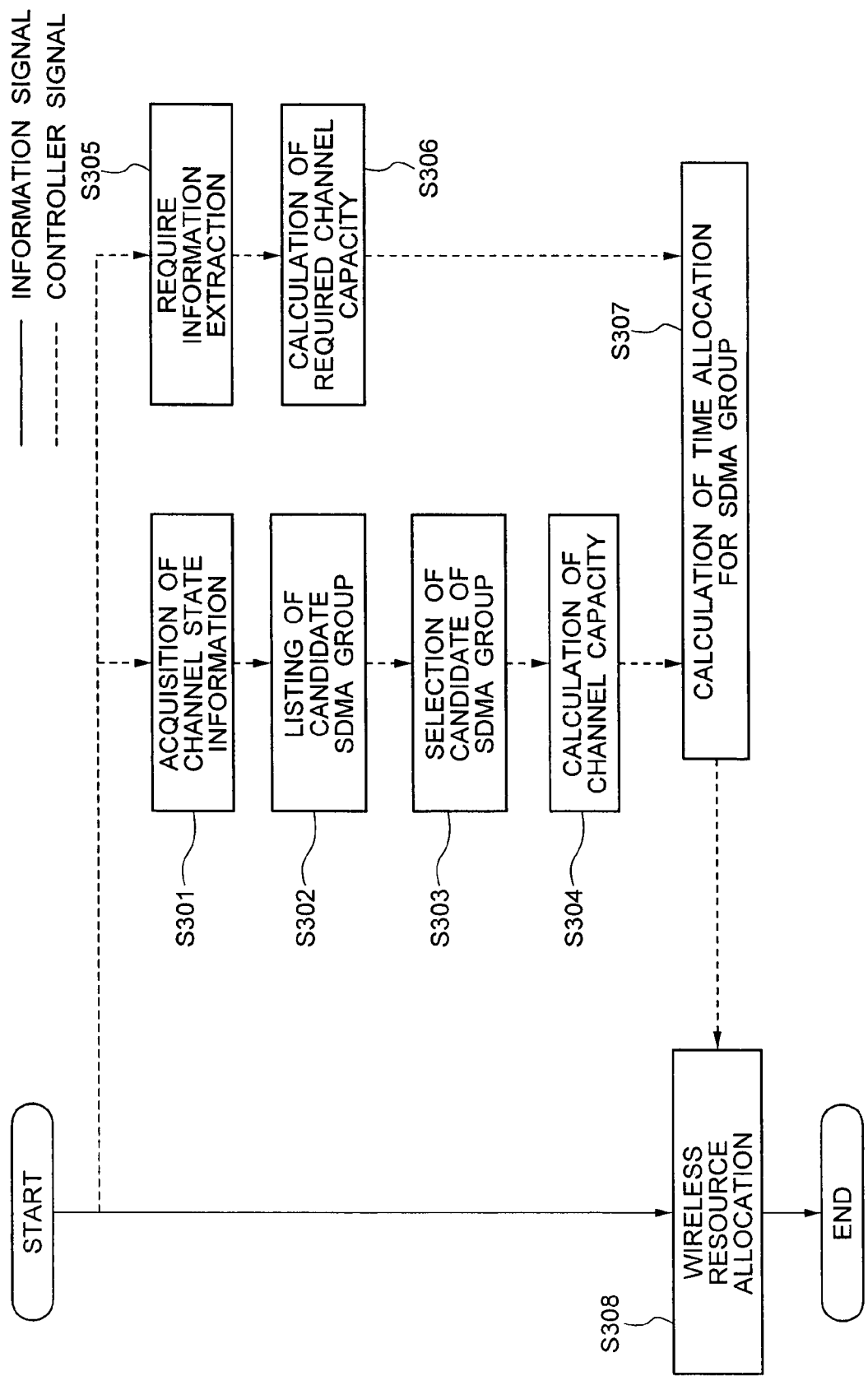
FIG. 7 is a flowchart showing operation to allocate wireless resources.

FIG. 7 is a flowchart showing a processing procedure of the wireless resource allocation according to an embodiment of the present invention. Description will now be given of a procedure in which information items regarding channels and requirements are extracted, the information items are converted according to one and the same index, for example, channel capacity, and then the ratio of time is optimized for each SDMA on the basis of the information items.

In step 301, information of a wireless channel between the access point and each station is extracted. The processing is executed by the channel state information calculator 203-*c*. The information of the wireless channel is measured in a predetermined method. In a first method, the access point measures the information. In a second method, the station measures the information. In the first method, the information thus measured is on a wireless channel in a direction from the station to the access point. In the second method, the information thus measured is on a wireless channel in a direction from the access point to the station and the result measured by the station is notified to the access point. Description will next be given of an example of step S301 in which a channel matrix (representing channel responses corresponding to the number of the antennas) is extracted in the second method.

In a wireless communication system including an access point including m antennas and stations #k each of which including n antennas, a reception signal $R_k=[r_{1,k}, r_{2,k}, \ldots, r_{n,k}]^T$ received by a station STA #k can be expressed, using a channel matrix $H_k$ between the access point and the station STA #k and a pilot signal $T_k=[t_{1,k}, t_{2,k}, \ldots, t_{n,k}]^T$ from the access point to the station STA #k, as follows.

$$R_k = H_k T_k \quad (1)$$

Station (STA) #k detects the channel matrix Hk by use of a detection algorithm, for example, Zero Forcing (ZF) as below.

$$H_k = R_k T_k^{-1} \quad (2)$$

The arithmetic operation may be carried out using an averaging operation in which the pilot signals received a plurality of times are averaged. In this case, if the fluctuation rate of the channel is sufficiently low, it is possible to reduce the influence from noise, and hence the estimation precision to estimate the channel state can be increased.

The channel state information in step S301 includes, in addition to the Signal to Noise power Ratio (SNR), the Signal to Interference power Ratio (SIR), and the Received Signal Strength Indicator (RSSI); channel parameters such as the Bit Error Rate (BER), a delay profile, a modulation multiple number, a coding ratio, and/or the diffusion ratio. If the Adaptive Array Antenna (AAA) is employed, weights are calculated using as reference signals a central frequency, an incoming direction, a modulation method, and polarization of a desired radio wave, which are preliminary knowledge to construct an evaluation function. However, also in the AAA technique, the evaluation function is calculated also using channel state information.

Next, the SDMA groups to be used in the wireless resource allocation are listed in step S302. According to the SDMA technique, there exist a plurality of combinations for the SDMA groups. Channel quality is periodically calculated for the combinations. The calculation processing is executed by the channel state information evaluator 206-a. Description will now be given of operation in a system including, for example, an access point with four antennas, a station STA #1 with two antennas, a station STA #2 with two antennas, and a station STA #3 with two antennas. If the number of simultaneous connections is limited to two, there exist $_3C_1+_3C_2=6$ combinations of stations for SDMA group candidates as shown in FIG. 8. However, it is not necessarily required to use all of the combinations. Optimal combinations are selected from the combinations according to the processing capability. FIG. 8 shows the channel capacity of SDMA groups in addition to the SDMA group candidates. The channel capacity is calculated in step S304.

In a second mode of step S302, the SDMA group candidates are expanded. This is carried out by the channel state information evaluator 206-a. If the MIMO-SDMA technique is employed, the number of streams can be changed by changing transmission and reception weights in the signal processing unit 203. Description will now be given of operation of MIMO-SDMA in a system including, for example, an access point with four antennas, a station STA #1 with two antennas, a station STA #2 with two antennas, and a station STA #3 with two antennas. In this system, the number of streams is limited to the number of antennas of the access point, i.e., four. Under a condition that the system uses four streams, if the number of simultaneous connections is three in FIG. 9, the streams are distributed in at least three ways, i.e., candidates 1 to 3. If the above condition is not designated, there exist more combinations for the candidates. By expanding the SDMA group candidates using this method, a more appropriate SDMA group can be selected according to requirements. Moreover, it is not necessary to search all patterns of combinations. The system needs only to select an optimal one from the limited range of the combinations according to the processing capability. FIG. 9 shows the channel capacity of SDMA groups in addition to the SDMA group candidates. The channel capacity is calculated in step S304.

In a third mode of step S302, the system provides a power distribution method for each SDMA. This processing is executed by the channel state information evaluator 206-a. It is well known that when the SDMA is employed, the optimal power distribution to the respective SDMAs is attained according to the Water Filling (WF) theorem. Details of the theorem will be described in conjunction with expression (6). The optimization is optimization of power distribution to the respective stations, and hence the requirement can be likely satisfied by changing the distribution method even by sacrificing the power efficiency. Description will now be given of a case in which the MIMO-SDMA technique is employed in a system including, for example, an access point with four antennas, a station STA #1 with two antennas, a station STA #2 with two antennas, and a station STA #3 with two antennas. In FIG. 10, the number of simultaneous connections is at most two. However, by distributing power irrespectively of the WF theorem, the patterns of combinations are expanded as indicated by candidates 1 and 2. By expanding the candidates for the SDMA groups in this method, it is possible to select a further more appropriate SDMA group according to the requirement. All the candidates need not be employed. It is only necessary to select an optimal one from the limited range of the combinations according to the processing capability. FIG. 10 shows the channel capacity of SDMA groups in addition to the SDMA group candidates. The channel capacity is calculated in step S304.

It is also possible to list the SDMA group candidates by combining the first to third modes of step S302 with each other.

Next, in step S303, to reduce the number of calculation steps, the system selects SDMA group candidates to be used in the wireless resource allocation. The processing is executed by the channel resource allocator 206 (specifically, the channel state information evaluator 206-a). Since it is possible to use all of the SDMA groups listed in step S302, step S303 may be dispensed with.

In step S303, an index value representing a correlation between channels is calculated using the channel state information extracted, for example, in step S301. The processing is executed by the wireless resource allocator 206 (specifically, the channel state information evaluator 206-a). According to the channel matrix produced in step S301 which extracts channel state information, the system calculates, for example, a correlation value between two antennas. That is, the system calculates a vector product between a channel matrix generated from a first antenna and a result of conjugate transposition of a channel matrix generated from a second antenna. From the product, an absolute value of each channel matrix is subtracted. The correlation value $\rho_{TX1\,TX2}$ between the channel matrix formed by an antenna Tx1 and that formed by an antenna Tx2 is expressed as follows.

$$\rho_{T\times 1 T\times 2} = \frac{h_{T\times 1}^H \cdot h_{T\times 2}}{|h_{T\times 1}| \cdot |h_{T\times 2}|} \quad (3)$$

The correlation value is calculated in this way. However, according to the present invention, since the access point includes a plurality of antennas, the system may calculates a combination of channel characteristics formed by the antennas. Or, it is also possible to select an appropriate number of antennas for the calculation of the channel characteristics. For each station, the total of the correlation values is calculated using expression (3) to select a combination for which the total is less than a threshold value (a combination with a lower correlation). The combination is designated as an SDMA group candidate. Any combination other than the combination for which the total exceeds a threshold value (a combination with a higher correlation) is selected. FIG. 11 shows an example in which the total of correlation values is calculated for each station in a system including, for example, an access point with four antennas, a station STA #1 with two antennas, a station STA #2 with two antennas, and a station STA #3 with two antennas. If the number of simultaneous connections is two, the correlation value for a combination of STA #1 and STA #3 is 0.9. For a high correlation, it is not likely to obtain large channel capacity. Therefore, the SDMA group including STA #1 and STA #3 is removed from the candidates. This resultantly reduces the number of calculation steps.

Figures 12, 13:
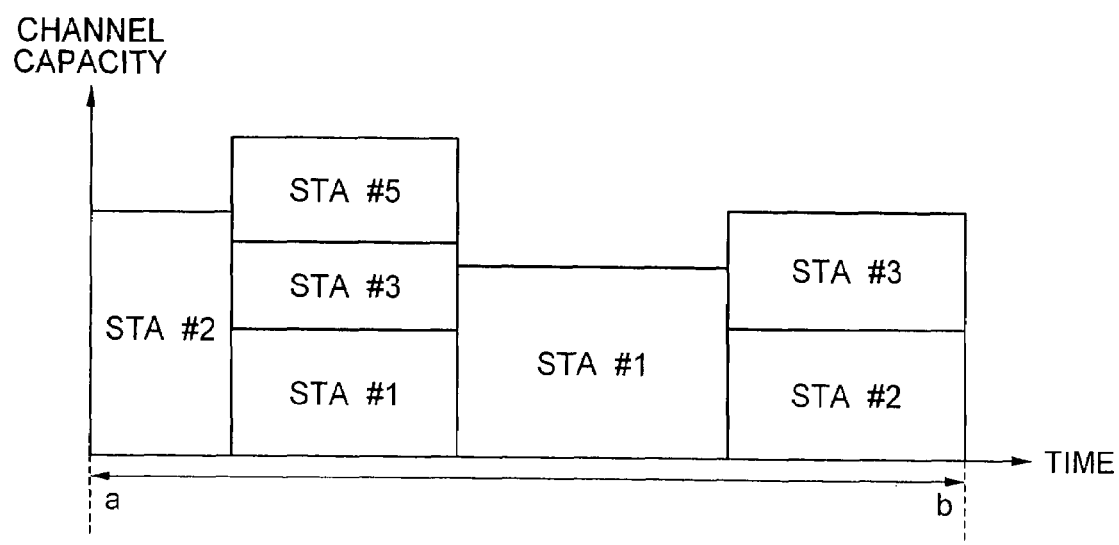
FIG. 12 is a diagram showing an example of a table created in step 303 of FIG. 7 (No. 2).
FIG. 13 is a graph showing an example of wireless resource allocation according to the present invention.

In a second mode of step S303, the system employs a method in which SDMA groups are beforehand estimated to reduce the number of calculation steps. The processing is executed by the wireless resource allocator 206 (specifically, the channel state information evaluator 206-a). As described above, in the operation using the SDMA, the higher the correlation between the channel matrices of the stations is, the more the channel capacity is. In the second mode, the system estimates a direction of each station, not the correlation. Stations apart from each other are categorized to belong to one and the same SDMA group. It is assumed now there exists an environment including, for example, an access point with four antennas, a station STA #1 with two antennas, a station STA #2 with two antennas, and a station STA #3 with two antennas. To estimate the direction of the station, there exist, for example, an MUSIC algorithm (a method of analyzing an eigen value of a covariance matrix of data received by a plurality of antennas) and a method of detecting the direction by turning 360° a beam having sharp directivity. By using such method of estimating the incoming direction, the system generates a table as shown in FIG. 12. It is not likely for stations, which exist in the vicinity of each other with respect to the direction, to gain large channel capacity. Therefore, SDMA group candidates including such stations are removed. In FIG. 12, since the access point is near the station #1 and the station #2 with respect to the direction, the SDMA group candidates including the station #1 and #2 are removed. This resultantly reduces the number of calculation steps.

In a third mode of step S303, the system employs a method to beforehand estimate SDMA groups to thereby reduce the number of calculation steps. The processing is executed by the wireless resource allocator 206 (specifically, the channel state information evaluator 206-a). In general, the channel capacity per station is larger in the communication conducted between a first unit and a second unit using the SDM technique in a one-to-one communication without using the SDMA technique than that in the communication conducted between a first unit and a plurality of units in a one-to-multi communication using the SDMA technique. Therefore, for each station, the system first confirms the channel state using, for example, the Received Signal Strength Indicator (RSSI). If the state is not appropriate, the calculation for the situation of the SDMA technique is not conducted for the station. The amount of calculation steps is resultantly reduced.

It is also possible to select the SDMA group candidates by combining the first to third modes of step S303 with each other.

Subsequently, for each station, the system calculates the channel capacity of the station when the SDMA technique is employed. The processing is executed by the wireless resource allocator 206 (specifically, the channel state information evaluator 206-a). Description will now be given of an example in which the MIMO-SDMA technique is employed for an access point with four antennas, a station STA #1 with two antennas, and a station STA #2 with two antennas. In this situation, a reception signal $R_1$ of STA #1 and a reception signal $R_2$ of STA #2 are represented, using a transmission signal $T_1$ to STA #1, a transmission signal $T_2$ to STA #2, and channel matrices between the access point and the stations $H_{11}$, $H_{12}$, $H_{21}$, and $H_{22}$ as follows.

$$R_1 = \begin{bmatrix} R_{11} \\ R_{12} \end{bmatrix}, R_2 = \begin{bmatrix} R_{21} \\ R_{22} \end{bmatrix} = \begin{bmatrix} \overbrace{\begin{bmatrix} h_{11} & h_{12} \\ h_{21} & h_{22} \end{bmatrix}}^{H_{11}} & \overbrace{\begin{bmatrix} h_{13} & h_{14} \\ h_{23} & h_{24} \end{bmatrix}}^{H_{12}} \\ \underbrace{\begin{bmatrix} h_{31} & h_{32} \\ h_{41} & h_{42} \end{bmatrix}}_{H_{21}} & \underbrace{\begin{bmatrix} h_{33} & h_{34} \\ h_{43} & h_{44} \end{bmatrix}}_{H_{22}} \end{bmatrix} \times \begin{bmatrix} \begin{bmatrix} T_{11} \\ T_{12} \end{bmatrix} \to T_1 \\ \begin{bmatrix} T_{21} \\ T_{22} \end{bmatrix} \to T_2 \end{bmatrix} \quad (4)$$

When expression (4) is expanded, it is recognizable that in the reception signal $R_1$ of STA #1, the transmission signal $T_2$ to STA where #2 is superimposed as an interference wave in addition to a desired signal $T_1$. Also, in the reception signal $R_2$ of STA #2, the transmission signal $T_1$ to STA #1 is superimposed in addition to a desired signal $T_2$. To suppress the interference, the access point beforehand adjusts the amplitude and phases of the signals. For example, in a null steering method, to set X to zero in advance, a null matrix is calculated using channel matrices. A result obtained by multiplying the null matrix thereto is transmitted to the system. The null steering method is described in the article, Andre Bourdoux, Nadia Khaled, "Joint Tx-Rx Optimisation for MIMO-SDMA Based on a Null-space Constraint", IEEE2002. pp. 171-172.

$$\begin{bmatrix} R_1 \\ R_2 \end{bmatrix} = \begin{bmatrix} H_{11} & H_{12} \\ H_{21} & H_{22} \end{bmatrix} \times \overbrace{[\text{null}(H_{21}\ H_{22})\ \text{null}(H_{11}\ H_{12})]}^{W} \times \begin{bmatrix} T_1 \\ T_2 \end{bmatrix}$$

$$= \begin{bmatrix} H'_{11} & 0 \\ 0 & H'_{22} \end{bmatrix} \times \begin{bmatrix} T_1 \\ T_2 \end{bmatrix} \quad (5)$$

As a result, mutually independent channels are formed between the access point and the stations. It is assumed to carry out an MIMO transmission, for example, an eigenmode transmission (Eigenbeam Space Division Multiplex (E-SDM) transmission) using the mutually independent channels. Channel capacity C of E-SDM transmission is expressed as follows.

$$C = B\log_2(1 + \lambda_i \gamma_i) \quad [bps] \tag{6}$$

$$\sum_{i=1}^{M_O} \gamma_i = \gamma_0$$

In expression (6), B indicates a signal bandwidth and $\gamma_i$ is the SNR. Also, $\lambda_i$ indicates an eigen value obtained by conducting the Singular Value Decomposition (SVD) for a channel matrix as follows.

$$H = V_K \lambda U_K^H \tag{7}$$

Using the above method, the channel capacity is obtained for each station when the MIMO-SDMA technique is employed. Although the above method is available to obtain the channel capacity, it is also possible to estimate the channel capacity as a value estimated by approximation. In the embodiment, the evaluation of the channel state information, namely, the calculation of the channel capacity and calculation of weights are carried out by the channel state information evaluator 206-a. However, it is also possible to calculate the weights by the weight calculator 206-f as shown in FIG. 6. In expression (7), V and U are inputted via the weight signal 15 to the weight module 203-b to be multiplied by each other in the combining module 203-a. For the weight calculation, there may also be employed a method using "Zero-Forcing (ZF)" or "Minimum Mean Square Error (MMSE)" in addition to "E-SDM".

In the description of the embodiment, the processing is executed in an order of steps S302, S303, and S304, namely, the listing, selection, and calculation of SDMA groups. However, the processing may also be executed in an order of steps S302, S304, and S303.

In step S305, the system extracts information of requirement from each station or application. This processing is executed by the interface controller 205-a. The require information is measured in a predetermined method. For example, the require information is extracted by use of a predetermined protocol such as Hybrid Coordination Function Controlled Channel Access (HCCA) prescribed in the standard of IEEE802.1.1e. According to the HCCA, it is determined to conduct, before communication is started between a station and an access point, negotiation of communication quality therebetween. In a second method to measure the require information, the system measures information regarding a requirement described in a packet transmitted to the system. For example, the system extracts require information by analyzing a User's Priority header of IEEE802.1D.

The require information in step S305 includes, throughput, priority, an application type, capacity of a buffer, delay, and jitter, in addition to the channel capacity.

In step S306, the require information extracted in step S305 is converted into the index equal to that of the information processed in step S304. The processing is executed in the require information evaluator 206-b. The information of the wireless channel is converted into, for example, the channel capacity. If only the SNR is notified as the require information, the information is converted into the channel capacity by use of expression (6). The resultant value corresponds to a signal inputted from the require information evaluator 206-b to the optimizer 206-c. If the require information is associated with higher priority or a long delay, a large value may be outputted to the optimizer 206-c.

The index value obtained by evaluating the channel state information or the require information is represented by a positive number. It is assumed that the larger the value is, the better the state of the channel is or the stronger the requirement is. However, there may be employed other indices. Also to reduce the amount of feedback information, it is possible to share, among the access point and the stations, tables each of which includes the information obtained by evaluating the channel state information and the channels such that table numbers respectively assigned thereto are communicated therebetween.

In step S307, according to the channel state information and the require information, a plurality of SDMA group candidates are selected to calculate the time ratios for the selected SDMA groups. The processing receives as inputs thereto the SDMA groups and the tables (FIGS. 8 to 10) regarding the channel capacity for each station which are obtained by the channel state information evaluator 206-a, i.e., through processing in steps 302 and S303 and the channel capacity obtained in step S306 by the require information evaluator 206-b. The processing then determines the SDMA groups to be used and calculates the time ratio for each of the SDMA groups. There may be employed the Linear Programming (LP) as an example of the optimizing method to determine the SDMA groups to satisfy the communication capacity and to optimize the time ratios for the respective SDMA groups. The linear programming is a method of obtaining a maximum or minimum value of an objective function under conditions of constraint represented by inequalities of the first degree. Various algorithms have already been devised for the linear programming. The linear programming is implemented using conditions of constraint and the objective function. By changing the objective function, there is obtained a result corresponding to a target of the system while satisfying the conditions of constraint.

$$\alpha_1 \begin{bmatrix} X_{11} \\ X_{12} \\ \vdots \\ X_{1n} \end{bmatrix} + \alpha_2 \begin{bmatrix} X_{21} \\ X_{22} \\ \vdots \\ X_{2n} \end{bmatrix} + \ldots + \alpha_m \begin{bmatrix} X_{m1} \\ X_{m2} \\ \vdots \\ X_{mn} \end{bmatrix} \geq \begin{bmatrix} TP_1 \\ TP_2 \\ \vdots \\ TP_n \end{bmatrix} \tag{8}$$

$$0 \leq \alpha_1 \leq 1, \, 0 \leq \alpha_2 \leq 1, \, 0 \leq \alpha_m \leq 1$$

$$0 \leq \sum \alpha \leq 1$$

In expression (8), $\alpha_p$ is an unknown value indicating the ratio of time occupied by SDMA group #p, $X_{pq}$ is a known value indicating the channel capacity of station #q belonging to SDMA group #p, $TP_q$ is the channel capacity required by station #q, m is the number of SDMA groups, and n is the number of stations. If there exists a solution $(\alpha_1, \alpha_2, \ldots, \alpha_m)$ satisfying the expressions of constraint, all stations can satisfy the required channel capacity. Moreover, under the conditions of restriction, if a condition that an objective function $$\alpha_1 + \alpha_2 + \ldots + \alpha_m \tag{9}$$

takes a minimum value, there are obtained, while satisfying the requirements, $\alpha_1, \alpha_2, \ldots, \alpha_m$ for which the period of time used by the overall system takes the minimum value. Similarly, by adding a condition that an objective function $$\alpha_1 \begin{bmatrix} X_{11} \\ X_{12} \\ \vdots \\ X_{1n} \end{bmatrix} + \alpha_2 \begin{bmatrix} X_{21} \\ X_{22} \\ \vdots \\ X_{2n} \end{bmatrix} + \ldots + \alpha_m \begin{bmatrix} X_{m1} \\ X_{m2} \\ \vdots \\ X_{mn} \end{bmatrix} \tag{10}$$

takes a maximum value, there are obtained, while satisfying the requirements, $\alpha_1, \alpha_2, \ldots, \alpha_m$ for which the channel capacity of the overall system takes the maximum value. In this connection, by setting the right side of expression (8) to zero, there is obtained a state in which no requirement is received from the stations and the applications.

If the system is expanded to include the uplink and downlink signals, there is obtained expression (11) as follows.

$$\alpha_1 \begin{bmatrix} X_{11} \\ \vdots \\ X_{1n} \\ 0 \end{bmatrix} + \ldots \alpha_m \begin{bmatrix} X_{m1} \\ \vdots \\ X_{mn} \\ 0 \end{bmatrix} + \beta_1 \begin{bmatrix} 0 \\ Y_{11} \\ \vdots \\ Y_{1n} \end{bmatrix} + \ldots + \beta_m \begin{bmatrix} 0 \\ Y_{m1} \\ \vdots \\ Y_{mn} \end{bmatrix} \geq \begin{bmatrix} TP_{X1} \\ \vdots \\ TP_{Xn} \\ TP_{Y1} \\ \vdots \\ TP_{Yn} \end{bmatrix} \quad (11)$$

$$0 \leq \alpha_1 \leq 1, \ldots, 0 \leq \alpha_m \leq 1, 0 \leq \beta_1 \leq 1, \ldots, 0 \leq \beta_m \leq 1$$

$$0 \leq \sum \alpha + \sum \beta \leq 1$$

In expression (11), $\alpha_p$ is an unknown value indicating the ratio of time occupied by SDMA group #p for uplink transmission, $\beta_p$ is an unknown value indicating the ratio of time occupied by SDMA group #p for downlink transmission, $X_{pq}$ is a known value indicating the channel capacity of station #q belonging to SDMA group #p for uplink transmission, $Y_{pq}$ is a known value indicating the channel capacity of station #q belonging to SDMA group #p for downlink transmission, $TPX_q$ is the channel capacity required by a station for uplink transmission, $TPY_q$ is the channel capacity required by a station for downlink transmission, m is the number of SDMA groups, and n is the number of stations.

It is assumed that the system is expanded to include priority in addition to the uplink and downlink signals. The priority is categorized into two types, namely, a fixed quantity guarantee type (or real-time type such as voice, video, and streaming) and a relative guarantee type (or non-real-time type such as e-mail). The conditions of constraint are expressed as follows.

$$\alpha_1 \begin{bmatrix} X_{11} \\ \vdots \\ X_{1n} \\ X'_{11} \\ \vdots \\ X'_{1n} \\ 0 \end{bmatrix} + \ldots \alpha_m \begin{bmatrix} X_{m1} \\ \vdots \\ X_{mn} \\ X'_{m1} \\ \vdots \\ X'_{mn} \\ 0 \end{bmatrix} + \beta_1 \begin{bmatrix} 0 \\ Y_{11} \\ \vdots \\ Y_{1n} \\ Y'_{11} \\ \vdots \\ Y'_{1n} \end{bmatrix} + \ldots + \beta_m \begin{bmatrix} 0 \\ Y_{m1} \\ \vdots \\ Y_{mn} \\ Y'_{m1} \\ \vdots \\ Y'_{mn} \end{bmatrix} \geq \begin{bmatrix} TP_{X1} \\ \vdots \\ TP_{Xn} \\ 0 \\ TP_{Y1} \\ \vdots \\ TP_{Yn} \\ 0 \end{bmatrix} \quad (12)$$

$$0 \leq \alpha_1 \leq 1, \ldots, 0 \leq \alpha_m \leq 1, 0 \leq \beta_1 \leq 1, \ldots, 0 \leq \beta_m \leq 1$$

$$0 \leq \sum \alpha + \sum \beta \leq 1$$

In expression (12), $\alpha_p$ is an unknown value indicating the ratio of time occupied by SDMA group #p for uplink transmission, $\beta_p$ is an unknown value indicating the ratio of time occupied by SDMA group #p for downlink transmission, $X_{pq}$ is a known value indicating the channel capacity of station #q belonging to SDMA group #p for uplink transmission (fixed quantity guarantee type), $Y_{pq}$ is a known value indicating the channel capacity of station #q belonging to SDMA group #p for downlink transmission (fixed quantity guarantee type), $X'_{pq}$ is a known value indicating the channel capacity of station #q belonging to SDMA group #p for uplink transmission (relative guarantee type), $Y'_{pq}$ is a known value indicating the channel capacity of station #q belonging to SDMA group #p for downlink transmission (relative guarantee type), $TPX_q$ is the channel capacity required by a station for uplink transmission, $TPY_q$ is the channel capacity required by a station for downlink transmission, m is the number of SDMA groups, and n is the number of stations.

Since the requirement of relative-guarantee-type stations is zero, the wireless resource can be allocated to the station of fixed quantity guarantee type with higher priority. Moreover, by adding a condition that an objective function $$\alpha_1 \begin{bmatrix} X'_{11} \\ X'_{12} \\ \vdots \\ X'_{1n} \end{bmatrix} + \ldots + \alpha_m \begin{bmatrix} X'_{m1} \\ X'_{m2} \\ \vdots \\ X'_{mn} \end{bmatrix} + \beta_1 \begin{bmatrix} Y'_{11} \\ Y'_{12} \\ \vdots \\ Y'_{1n} \end{bmatrix} + \ldots + \beta_m \begin{bmatrix} Y'_{m1} \\ Y'_{m2} \\ \vdots \\ Y'_{mn} \end{bmatrix} \quad (13)$$

takes a maximum value, there are obtained, while satisfying the requirement of stations of fixed quantity guarantee type; $\alpha_1, \alpha_2, \ldots, \alpha_m$ for which the total of channel capacity of the stations of relative guarantee type takes the maximum value.

In step S308, the system produce an allocation schedule by conducting a scheduling operation according to information regarding the wireless resource allocation for the respective stations determined by the optimizer 206-c, namely, the SDMA groups and the periods of time allocated to the respective SDMA groups. According to the schedule, the system controls the wireless unit 202, the signal processing unit 203, the modem controller 204, and the packet controller 205. The result of wireless resource allocation represents the periods of time allocated to the respective SDMA groups. Therefore, it is only necessary to allocate time according to the ratio thus determined at an interval of time for the scheduling. The actual scheduling order is not restricted. An example of implementing the embodiment is HCCA in the standard of IEEE802.11e. According to HCCA, there is prescribed a protocol in which the access point controls operation of the stations in a centralized way by use of the polling control technique such that the access point and the stations perform wireless communication according to the scheduling of the access point.

FIG. 13 shows an example of wireless resource allocation according to the present invention (in a conceptual graph). In this graph in which the abscissa represents time, a period of time from a to b is allocated to wireless resources. The ordinate represents channel capacity, which varies between the SDMA groups.

Figure 14:
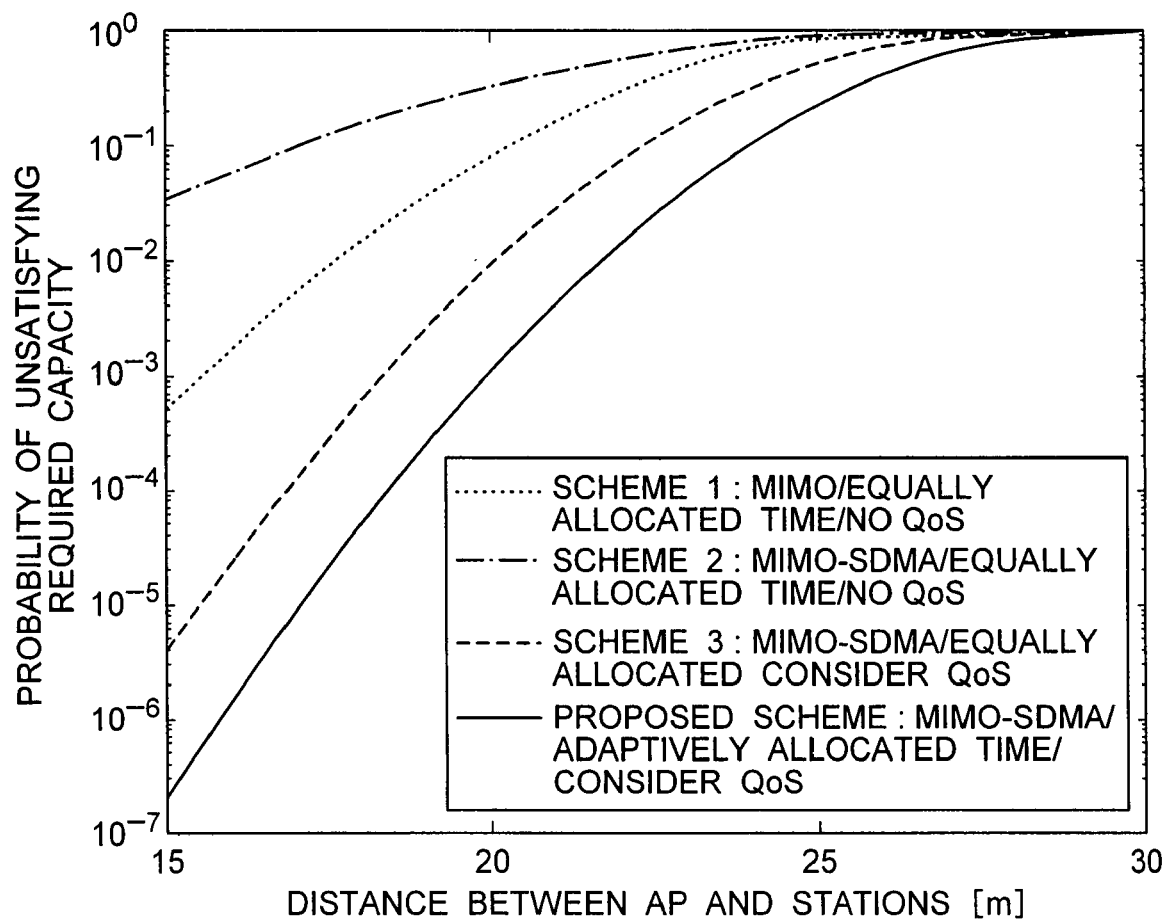
FIG. 14 is a graph comparing communication characteristics between the conventional method and the method of the present invention (No. 1).

FIG. 14 shows a graph drawn after wireless resource allocation according to the present invention, the graph showing a relationship between the distance between an access point and a station and a probability of a case in which the required channel capacity is not secured. It is assumed that the system includes three stations. Method 1 uses the MIMO technique, the quality of service is not taken into consideration, and a period of time obtained by equally dividing the channel estimation interval of time, 10 milliseconds (ms) is allocated to each station. Methods 2 and 3 and the method of the present invention adopt the MIMO-SDMA technique. Method 2 does not take the quality of service into consideration. In the simulation, since the number of simultaneous connections of stations is two, three stations are classified into two groups including a group including two stations and a group including one station at random. Time is equally allocated to the SDMA groups. In method 3, the quality of service is taken into consideration. From the SDMA groups, four groups are selected, the four groups being mutually different from each other. A judge step is conducted to determine whether or not the four groups include a group which secures the required channel capacity. However, time is equally allocated to the groups. In the method of the present invention, a judge step is conducted to determine whether or not conditions of restriction is satisfied, using the linear programming. The graph of FIG. 14 shows a relationship between the distance between an access point and a station of fixed quantity guarantee type and a probability of a case in which the required channel capacity is not secured. By comparing the MIMO technique (method 1) with the MIMO-SDMA technique (method 2) in which the quality of service is not taken into consideration, it is recognized that when the MIMO-SDMA technique (method 2) is used without taking the quality of service into consideration, the probability in which the required channel capacity cannot be secured for the distance of 15 meters (m) is deteriorated about ten times. This is because time is equally allocated to the SDMA groups. It is likely that the SDMA group including two stations cannot secure the required channel capacity. It is hence recognized that the characteristic is lower in the method using the SDMA technique than the conventional method depending on cases. Next, by comparing method 2 used without taking the quality of service into consideration with method 3 used by taking the quality of service into consideration, the probability is improved about $10^4$ for the distance of 15 meters (m). It can be recognized that the method of the present invention is more superior in the characteristic to the above comparison methods.

Figure 15:
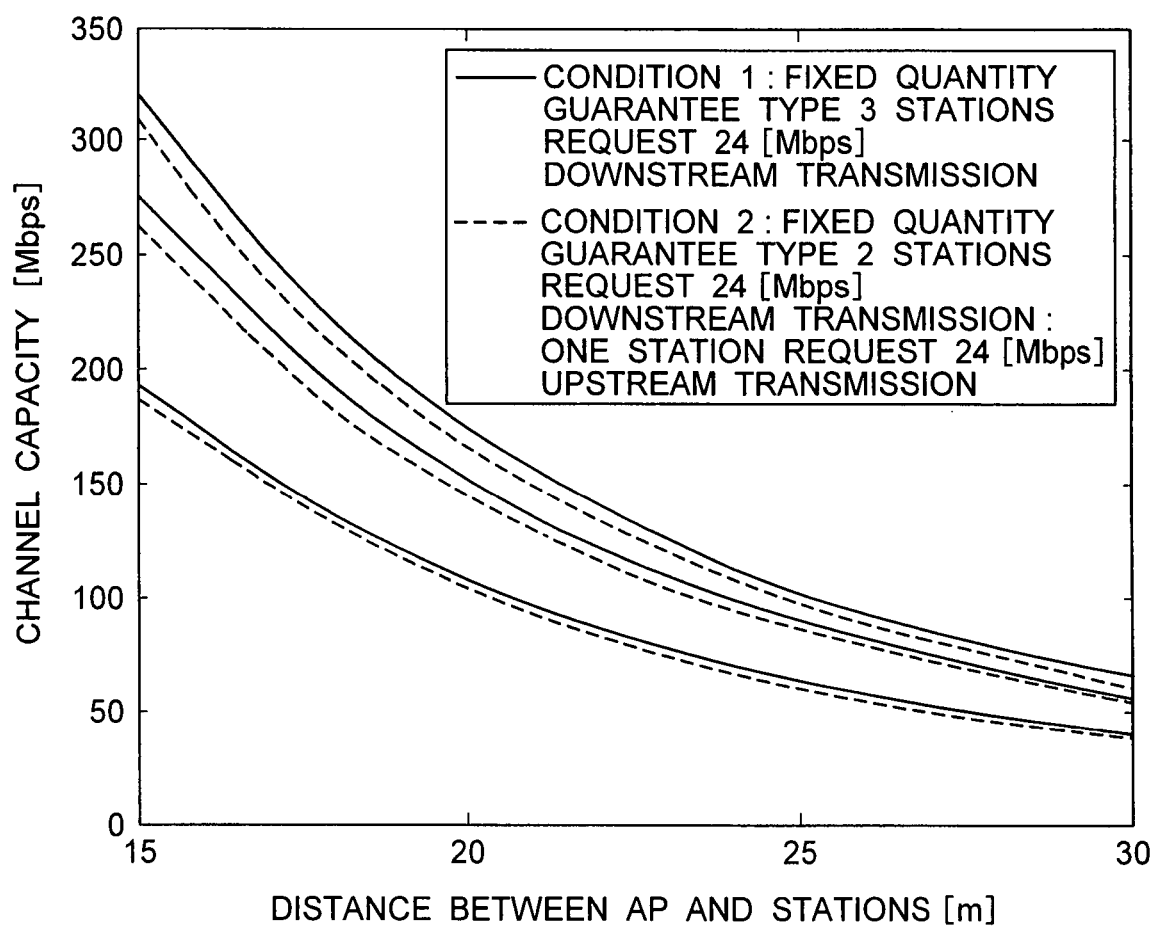
FIG. 15 is a graph comparing communication characteristics between the conventional method and the method of the present invention (No. 2).

FIG. 15 shows in a graph a relationship between the distance between an access point and a station of relative guarantee type and the total channel capacity of stations of relative guarantee type. It is assumed that the system includes stations of relative guarantee type in addition to three stations of fixed quantity guarantee type. In this situation, expression (13) in which the total channel capacity of the stations of relative guarantee type takes a maximum value is used as the objective function. It is assumed that the distance between the access point and each station of fixed quantity guarantee type is 15 meters and the channel capacity required by the station is 24 bits per second (bps). Among the stations, two stations request downlink transmission and one station requests uplink transmission. It is also assumed in this situation that, due to reversibility of the propagation path, one and the same channel capacity can be obtained for the downlink transmission and the uplink transmission. Since the number of stations of fixed quantity guarantee type becomes larger, the channel capacity is increased. This is because the probability of existence of the station capable of obtaining larger channel capacity becomes larger as the number of stations increases, because independent fading is provided for each station. It is recognizable that by use of the method of the present invention, the channel capacity of the stations of relative guarantee type can be secured while satisfying the requirements of stations of the fixed quantity guarantee type.

The present invention is applicable to the wireless communication systems. The present invention is most efficiently applied to operation in which communication is conducted by allocating wireless resources using the SDMA technique.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A wireless communication apparatus for communicating with a plurality of stations using Space Division Multiple Access (SDMA), comprising:
   a channel state information collecting unit which collects channel state information from each channel between the wireless communication apparatus and each station of the plurality of stations;
   a wireless resource allocating unit which generates a plurality of SDMA station combinations as SDMA group candidates from which a plurality of SDMA groups for conducting SDMA for the plurality of stations are selected such that at least one station of the plurality of stations may belong to multiple SDMA groups of the plurality of SDMA groups for conducting SDMA, estimates a communication performance for each of the stations belonging to the SDMA group candidates by using the channel state information, performs an optimization of an evaluation value of an objective function used to evaluate a degree of achieving an object of a system under conditions of constraint that include the communication performance estimated for each station and a communication performance required for each station or a communication performance required for an application provided to the stations, and determines, in accordance with a result of the optimization, periods of time to be respectively allocated to the plurality of SDMA groups selected from the SDMA group candidates to thereby allocate wireless resources to the plurality of stations; and
   a signal processing unit which communicates with the plurality of stations according to the wireless resources thus allocated.

2. A wireless communication apparatus according to claim 1, wherein the channel state information collecting unit collects, as the channel state information of each channel, a Signal to Noise power Ratio (SNR) or a Signal to Interference power Ratio (SIR).

3. A wireless communication apparatus according to claim 1, wherein the communication performance required for each channel or the application includes information regarding channel capacity required for the station corresponding to the channel or the application or information regarding delay allowed therefor.

4. A wireless communication apparatus according to claim 1, wherein the wireless resource allocating unit determines the plurality of SDMA station combinations as the SDMA group candidates according to a correlation of the channel state information.

5. A wireless communication apparatus according to claim 1, wherein the wireless resource allocating unit optimizes a period of time required for data communication with the plurality of stations as an evaluation value of an objective function under the conditions of constraint, and wherein the wireless resource allocating unit selects the SDMA groups and determines the allocation of the periods of time to the SDMA groups in accordance with the result of the optimization.

6. A wireless communication apparatus according to claim 1, wherein the wireless resource allocating unit optimizes a total of channel capacity for the plurality of stations as an evaluation value of an objective function under the conditions of constraint, and wherein the wireless resource allocating unit selects the SDMA groups and determines the allocation of the periods of time to the SDMA groups in accordance with the result of the optimization.

7. A wireless communication apparatus according to claim 1, wherein if the communication performance thus required includes transmission data of an absolute guarantee type and transmission data of a relative guarantee type, an evaluation index of the optimization calculation is a maximization of a total of channel capacity for communication of the transmission data of the relative guarantee type while satisfying a requirement of the communication performance for the transmission data of the absolute guarantee type.

8. A wireless communication apparatus according to claim 1, wherein if the communication performance thus required includes transmission data of an absolute guarantee type and transmission data of a relative guarantee type, an evaluation index of the optimization calculation is an operation to equally allocate channel capacity of the transmission data of the relative guarantee type to the respective stations of the plurality of SDMA groups while satisfying a requirement of the communication performance for the transmission data of the absolute guarantee type.

9. A wireless resource allocation method implemented by a wireless communication apparatus for communicating with a plurality of stations using Space Division Multiple Access (SDMA), comprising:
    a first step of collecting channel state information from each channel between the wireless communication apparatus and each station of the plurality of stations;
    a second step of generating a plurality of SDMA station combinations as SDMA group candidates from which a plurality of SDMA groups for conducting SDMA for the plurality of stations are selected such that at least one station of the plurality of stations may belong to multiple SDMA groups of the plurality of SDMA groups for conducting SDMA;
    a third step of estimating a communication performance for each of the stations belonging to the SDMA group candidates by using the channel state information, performing an optimization of an evaluation value of an objective function used to evaluate a degree of achieving an object of a system under conditions of constraint that include the communication performance estimated for each station and a communication performance required for each station or a communication performance required for an application provided to the stations, and determining, in accordance with a result of the optimization, periods of time to be respectively allocated to the plurality of SDMA groups selected from the SDMA group candidates to thereby allocate wireless resources to the plurality of stations; and
    a fourth step of communicating with the plurality of stations according to the allocated wireless resources.

10. A wireless resource allocation method according to claim 9, further comprising a step of collecting, as the channel state information of each channel, a Signal to Noise power Ratio (SNR) or a Signal to Interference power Ratio (SIR).

11. A wireless resource allocation method according to claim 9, wherein the communication performance required for each channel or the application includes information regarding channel capacity required for the station corresponding to the channel or the application or information regarding delay allowed therefor.

12. A wireless resource allocation method according to claim 9, wherein the second step further comprises determining the plurality of SDMA station combinations as the SDMA group candidates according to a correlation of the channel state information.

13. A wireless resource allocation method according to claim 9, wherein the wireless resource allocating unit optimizes a period of time required for data communication with the plurality of stations as an evaluation value of an objective function under the conditions of constraint, and wherein the wireless resource allocating unit selects the SDMA groups and determines the allocation of the periods of time to the SDMA groups in accordance with the result of the optimization.

14. A wireless resource allocation method according to claim 9, wherein the wireless resource allocating unit optimizes a total of channel capacity for the plurality of stations as an evaluation value of an objective function under the conditions of constraint, and wherein the wireless resource allocating unit selects the SDMA groups and determines the allocation of the periods of time to the SDMA groups in accordance with the result of the optimization.

15. A wireless resource allocation method according to claim 9, wherein if the communication performance thus required includes transmission data of an absolute guarantee type and transmission data of a relative guarantee type, an evaluation index of the optimization calculation is a maximization of a total of channel capacity for communication of the transmission data of the relative guarantee type while satisfying a requirement of the communication performance for the transmission data of the absolute guarantee type.

16. A wireless resource allocation method according to claim 9, wherein if the communication performance thus required includes transmission data of an absolute guarantee type and transmission data of a relative guarantee type, an evaluation index of the optimization calculation is an operation to equally allocate channel capacity of the transmission data of the relative guarantee type to the respective stations of the plurality of SDMA groups while satisfying a requirement of the communication performance for the transmission data of the absolute guarantee type.

* * * * *